(12) United States Patent
Chen et al.

(10) Patent No.: US 11,644,708 B2
(45) Date of Patent: May 9, 2023

(54) LIGHT SHIELDING ELEMENT SUBSTRATE AND DISPLAY DEVICE

(71) Applicant: Au Optronics Corporation, Hsinchu (TW)

(72) Inventors: Ming-Yao Chen, Hsinchu (TW); Jui-Chi Lo, Hsinchu (TW); Jui-Ping Yu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/400,135

(22) Filed: Aug. 12, 2021

(65) Prior Publication Data

US 2022/0317509 A1    Oct. 6, 2022

(30) Foreign Application Priority Data

Apr. 1, 2021  (TW) .................................. 110112249

(51) Int. Cl.
| | | |
|---|---|---|
| *G02F 1/1335* | (2006.01) | |
| *G02F 1/1333* | (2006.01) | |
| *G06V 40/13* | (2022.01) | |
| *G02F 1/13357* | (2006.01) | |

(52) U.S. Cl.
CPC .... *G02F 1/133512* (2013.01); *G02F 1/13338* (2013.01); *G02F 1/133357* (2021.01); *G02F 1/133514* (2013.01); *G02F 1/133617* (2013.01); *G02F 2202/36* (2013.01); *G02F 2203/11* (2013.01); *G06V 40/1318* (2022.01)

(58) Field of Classification Search
CPC ...... G06V 40/12; G06K 9/00006; G06K 9/00; G06F 3/0412; G06F 3/03547; G02F 1/13338; G02F 1/133514; G02F 1/133512; G02F 1/133357
See application file for complete search history.

(56) References Cited

U.S. PATENT DOCUMENTS

| | | | | |
|---|---|---|---|---|
| 10,048,530 | B1 * | 8/2018 | Kim ................... | G02F 1/133617 |
| 2012/0133618 | A1 * | 5/2012 | Usukura ................ | G06F 3/042 |
| | | | | 345/175 |
| 2013/0200364 | A1 * | 8/2013 | Tokunaga ......... | H01L 29/78636 |
| | | | | 257/43 |
| 2016/0216557 | A1 * | 7/2016 | Rho ................... | G02F 1/133528 |
| 2017/0062722 | A1 * | 3/2017 | Jesper ................ | H01L 51/0036 |

(Continued)

FOREIGN PATENT DOCUMENTS

| | | |
|---|---|---|
| CN | 109388267 | 2/2019 |
| CN | 109799653 | 5/2019 |

(Continued)

OTHER PUBLICATIONS

English translation for CN-112232306, Wang et al. (Year: 2021).*

*Primary Examiner* — Jonathan Y Jung
(74) *Attorney, Agent, or Firm* — JCIPRNET

(57) ABSTRACT

A light shielding element substrate includes a substrate, a transparent island structure and a first light shielding layer. The transparent island structure is located on the substrate. The first light shielding layer is located on the transparent island structure. The first light shielding layer is overlapping with a part of the top surface of the transparent island structure. The first light shielding layer has a first through hole overlapping the top surface of the transparent island structure.

20 Claims, 14 Drawing Sheets

(56) References Cited

U.S. PATENT DOCUMENTS

| | | | | |
|---|---|---|---|---|
| 2021/0072589 A1* | 3/2021 | Taguchi | ................ | G02B 5/208 |
| 2021/0233951 A1* | 7/2021 | Ootsuka | ............ | H01L 27/14627 |
| 2022/0221750 A1* | 7/2022 | Hirosawa | .......... | G02F 1/133512 |

FOREIGN PATENT DOCUMENTS

| | | | | |
|---|---|---|---|---|
| CN | 110399797 | | 11/2019 | |
| CN | 110673380 | | 1/2020 | |
| CN | 111668388 | | 9/2020 | |
| CN | 111965881 | | 11/2020 | |
| CN | 112232306 | | 1/2021 | |
| CN | 112232306 A | * | 1/2021 | ....... G02F 1/133514 |
| TW | 202105788 | | 2/2021 | |

\* cited by examiner

LIGHT SHIELDING ELEMENT SUBSTRATE AND DISPLAY DEVICE

CROSS-REFERENCE TO RELATED APPLICATION

This application claims the priority benefit of Taiwan application serial no. 110112249, filed on Apr. 1, 2021. The entirety of the above-mentioned patent application is hereby incorporated by reference herein and made a part of this specification.

BACKGROUND

Technical Field

The present invention relates to a light shielding element substrate and display device.

Description of Related Art

Currently, in order to increase the convenience of products, many manufacturers dispose sensing devices in the products. For example, in existing mobile phones, photosensitive devices for fingerprint identification are often disposed. In the existing fingerprint identification technology, the photosensitive device detects the light reflected by the fingerprint of a finger. Uneven fingerprint will cause a different intensity of the reflected light, so that different fingerprint appearances can be distinguished by the sensing device.

In General, the photosensitive device includes a photosensitive element. If the photosensitive element receives a light with large incident angle, it will cause poor contrast in the detected image and result in failed fingerprint identification.

SUMMARY

The present invention provides a light shielding element substrate, which can improve the problem that a width of a first through hole of a first light shielding layer is too large.

The invention provides a display device, which can improve the contrast of an image detected by a photosensitive element.

At least one embodiment of the present invention provides a light shielding element substrate. The light shielding element substrate includes a substrate, a transparent island structure, and a first light shielding layer. The transparent island structure is located on the substrate. The first light shielding layer is located on the transparent island structure. The first light shielding layer is overlapping with a part of a top surface of the transparent island structure. The first light shielding layer has a first through hole overlapping with the top surface of the transparent island structure.

At least one embodiment of the present invention provides a display device. The display device includes a light shielding element substrate and an active element substrate. The light shielding element substrate includes a first substrate, a transparent island structure, and a first light shielding layer. The transparent island structure is located on the first substrate. The first light shielding layer is located on the transparent island structure. The first light shielding layer is overlapping with a part of a top surface of the transparent island structure. The first light shielding layer has a first through hole overlapping with the top surface of the transparent island structure. The active element substrate is overlapping with the light shielding element substrate, and includes a second substrate, a photosensitive element, and a second light shielding layer. The photosensitive element is located on the second substrate. The second light shielding layer is located between the photosensitive element and the first light shielding layer. The second light shielding layer has a second through hole. The photosensitive element is overlapping with the second through hole and the first through hole in a normal direction of the first substrate.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
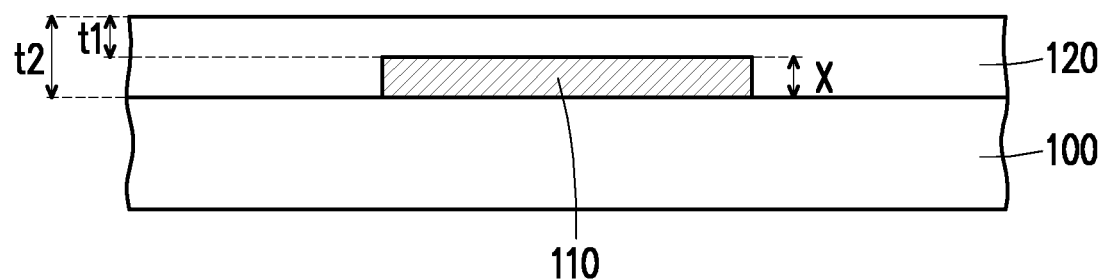
FIG. 1A to FIG. 1C are schematic cross-sectional views of a method for manufacturing a light shielding element substrate according to an embodiment of the present invention.
Figure 1B:
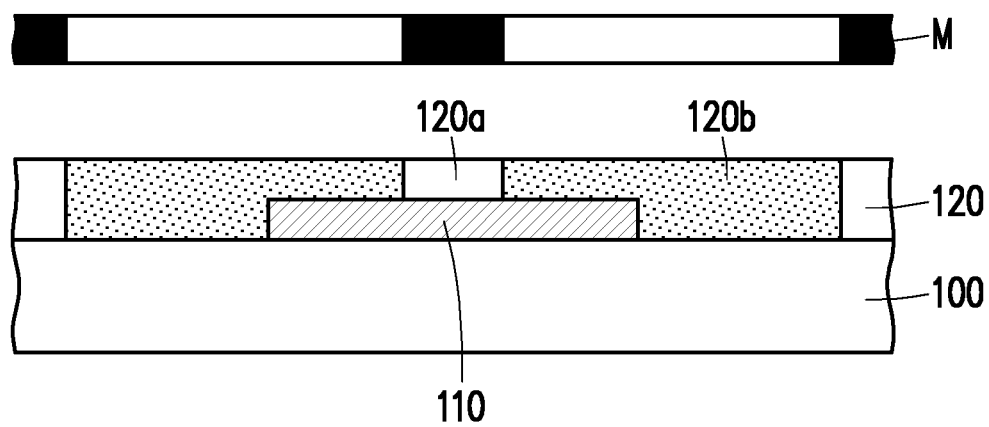
Figure 1C:
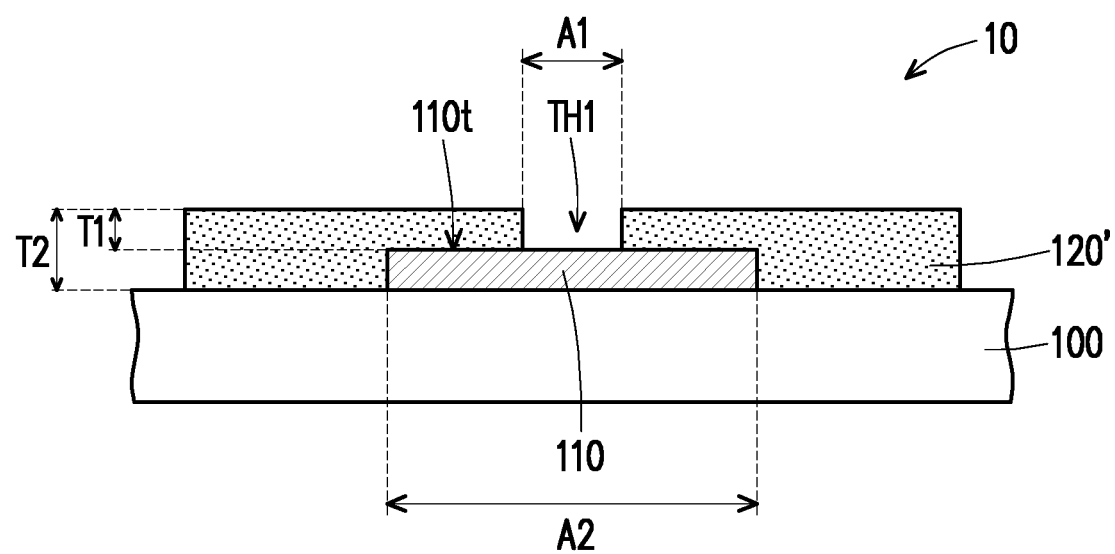

FIG. 1A to FIG. 1C are schematic cross-sectional views of a method for manufacturing a light shielding element substrate according to an embodiment of the present invention.

Referring to FIG. 1A, a transparent island structure 110 is formed on the first substrate 100. The material of the first substrate 100 can be glass, quartz, organic polymer or other suitable materials. The transparent island structure 110 is an organic material (such as a cured photoresist, epoxy, or other suitable materials) or an inorganic material (such as indium tin oxide, silicon oxide, silicon nitride, or other suitable materials). The transparent island structure 110 is a single-layer or multi-layer structure. The thickness X of the transparent island structure 110 is 200 nm to 1200 nm.

A light shielding material layer 120 is formed on the first substrate 100 and the transparent island structure 110. The light shielding material layer 120 is, for example, formed by spin coating or other similar methods. The light shielding material layer 120 has fluidity, so the thickness t1 of a portion of the light shielding material layer 120 covering the transparent island structure 110 in the normal direction of the first substrate 100 is smaller than the thickness t2 of a portion of the light shielding material layer 120 not covering the transparent island structure 110 in the normal direction of the first substrate 100.

In some embodiments, the light shielding material layer 120 includes a positive photoresist or a negative photoresist.

Referring to FIG. 1B, using the photomask M as a mask to irradiate light (such as ultraviolet light) to the light shielding material layer 120. In this embodiment, the light shielding material layer 120 is a negative photoresist. Therefore, the photomask M shields a top surface of a first portion 120a of the light shielding material layer 120, and the second portion 120b of the light shielding material layer 120 on both sides of the transparent island structure 110 is cured, wherein the first portion 120a of the light shielding material layer 120 is overlapping with the transparent island structure 110. In other embodiments, if the light shielding material layer 120 is a positive photoresist, the photomask which is selected will not cover the first portion 120a of the light shielding material layer 120.

Referring to FIG. 1C, a development process is performed on the light shielding material layer 120 to form a first light shielding layer 120'. Specifically, the first portion 120a of the light shielding material layer 120 is removed to form the first light shielding layer 120'. So far, the light shielding element substrate 10 is approximately completed.

In some embodiments, the material of the first light shielding layer 120' includes a cured photoresist, and the optical density (OD) of the first light shielding layer 120' is greater than 5.

In this embodiment, the first light shielding layer 120' is located on the transparent island structure 110. The first light shielding layer 120' is overlapping with a part of the top surface 110t of the transparent island structure 110, and the first light shielding layer 120' has a first through hole TH1 that is overlapping with the top surface 110t of the transparent island structure 110 in the normal direction of the first substrate 100. In some embodiments, the thickness of the first light shielding layer 120' located at the first through hole TH1 is T1. The thickness of the first light shielding layer 120' located outside the transparent island structure 110 and not overlapping with the transparent island structure 110 in the normal direction of the first substrate 100 is T2, and T1 is smaller than T2. In some embodiments, the thickness T1 is 200 nm to 1200 nm, and the thickness T2 is 1000 nm to 2000 nm.

In some embodiments, the resolution limit of the lithography process of the light shielding material layer 120 (FIG. 1A and FIG. 1B) will increase as the thickness of the light shielding material layer 120 becomes thinner. Therefore, with the arrangement of the transparent island structure 110, the thickness T1 of the first light shielding layer 120' located at the first through hole TH1 can be reduced, and then the width A1 of the first through hole TH1 can be reduced. Based on this, the problem that the width A1 of the first through hole TH1 is too large can be improved. In this embodiment, the width A1 of the first through hole TH1 is smaller than the width A2 of the transparent island structure 110. In some embodiments, the width A1 of the first through hole TH1 is 3 μm to 8 μm.

In some embodiments, the light shielding element substrate 10 is suitable for a photosensitive device, and the first through hole TH1 of the first light shielding layer 120' is suitable for an optical collimator. The smaller the width A1 of the first through hole TH1 is, the more the effect of light collimation is improved. In other words, in this embodiment, the effect of light collimation of the optical collimator can be improved by the arrangement of the transparent island structure 110. In this embodiment, in addition to forming a first through hole TH1 with a smaller width in the first light shielding layer 120', the light shielding ability of the first light shielding layer 120' can also be maintained.

Figure 2A:
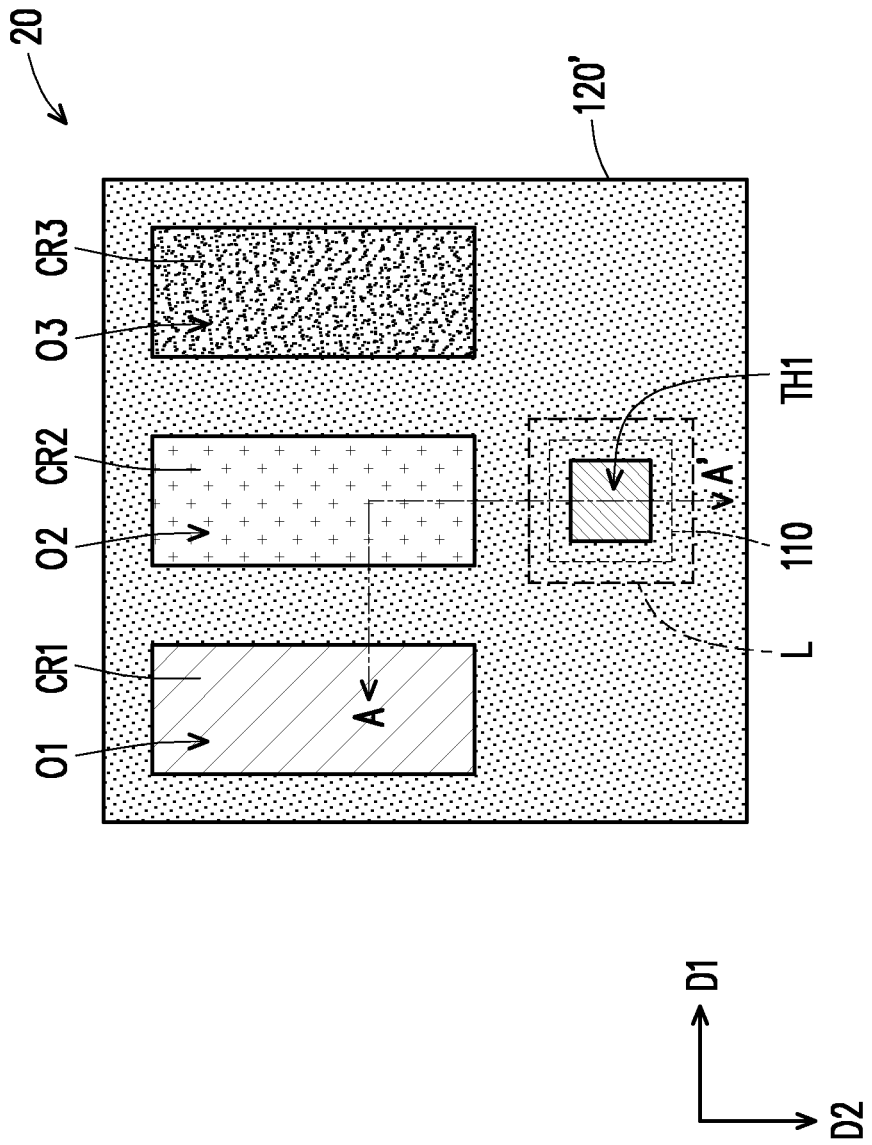
FIG. 2A is a schematic top view of a light shielding element substrate according to an embodiment of the present invention.
Figure 2B:
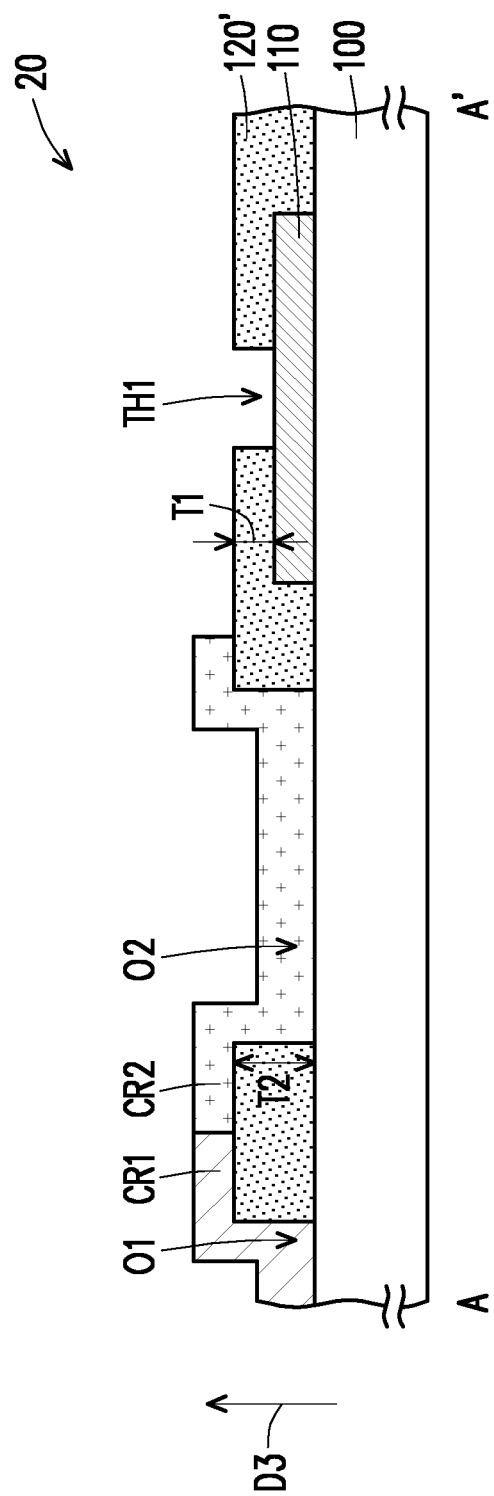
FIG. 2B is a schematic cross-sectional view taken along the line A-A' of FIG. 2A.

FIG. 2A is a schematic top view of a light shielding element substrate according to an embodiment of the present invention. FIG. 2B is a schematic cross-sectional view taken along the line A-A' of FIG. 2A.

It must be noted here that the embodiment of FIG. 2A and FIG. 2B follows the reference numerals and partial contents of the embodiment of FIG. 1A to FIG. 1C, wherein the same or similar components are denoted by the same or similar reference numerals, and the description of the same technical content is omitted. For the description of the omitted parts, reference may be made to the foregoing embodiments and will not be repeated in the following embodiments.

The main difference between the light shielding element substrate 20 of FIG. 2A and the light shielding element substrate 10 of FIG. 1C is that the light shielding element substrate 20 of FIG. 2A further includes a first color conversion element CR1, a second color conversion element CR2, and a third color conversion element CR3.

Referring to FIG. 2A and FIG. 2B, the first color conversion element CR1, the second color conversion element CR2, and the third color conversion element CR3 are, for example, color filter materials, quantum dot materials, or other materials configured to convert color of light.

The first color conversion element CR1, the second color conversion element CR2, and the third color conversion element CR3 are, for example, different colors. For example, in some embodiments, the light shielding element substrate 20 is suitable for a display device, and the first color conversion element CR1, the second color conversion element CR2, and the third color conversion element CR3 are respectively a red color filter element, a green color filter element, and a blue color filter element. The first color conversion element CR1, the second color conversion element CR2, and the third color conversion element CR3 correspond to the red sub-pixel, the green sub-pixel, and the blue sub-pixel, respectively.

In this embodiment, the first light shielding layer 120' has a first opening O1, a second opening O2, and a third opening O3. The first opening O1, the second opening O2, and the third opening O3 are arranged along a first direction D1. In some embodiments, the first direction D1 is parallel to scan lines of the display device and perpendicular to data lines of the display device, but the invention is not limited thereto. In other embodiments, the first direction D1 is parallel to the data lines of the display device and perpendicular to the scan lines of the display device. In this embodiment, the first through hole TH1 is located on a second direction D2 of the first opening O1, the second opening O2 or the third opening O3. The second direction D2 is substantially perpendicular to the first direction D1.

The first color conversion element CR1, the second color conversion element CR2, and the third color conversion element CR3 are located in the first opening O1, the second opening O2, and the third opening O3, respectively. The first opening O1, the second opening O2, and the third opening O3 are not overlapping with the transparent island structure 110 and the first through hole TH1. The thickness of the first light shielding layer 120' at the first through hole TH1 is T1, and the thickness of the first light shielding layer 120' at the first opening O1, the second opening O2, and the third opening O3 is T2, and T1 is smaller than T2.

The first opening O1, the second opening O2, and the third opening O3 and the first through hole TH1 are, for example, formed in the same patterning process. For example, a lithography process (such as the processes shown in FIG. 1B and FIG. 1C) is performed to simultaneously form the first opening O1, the second opening O2, the third opening O3, and the first through hole TH1.

In some embodiments, the photosensitive element L (not shown in FIG. 2B) is overlapping with the first through hole TH1 in the normal direction D3 of the first substrate 100. The photosensitive element L is, for example, formed on the first substrate 100 or formed on another substrate. In some embodiments, the photosensitive element L is formed on a second substrate (not shown) overlapping the first substrate 100, wherein the photosensitive element L on the second substrate is overlapping with the first through hole TH1 in the normal direction of the first substrate 100. In FIG. 2A and FIG. 2B, one photosensitive element L and one first through hole TH1 are used as an example for description. However, in practice, the light shielding element substrate 20 includes an array of photosensitive elements L and an array of first through hole TH1.

Based on the above, the width of the first through hole TH1 (including the width in the first direction D1, the second direction D2 or any other directions) can be reduced by the arrangement of the transparent island structure 110. Therefore, the effect of light collimation of the optical collimator and the contrast of the image detected by the photosensitive element L can be improved.

Figure 3A:
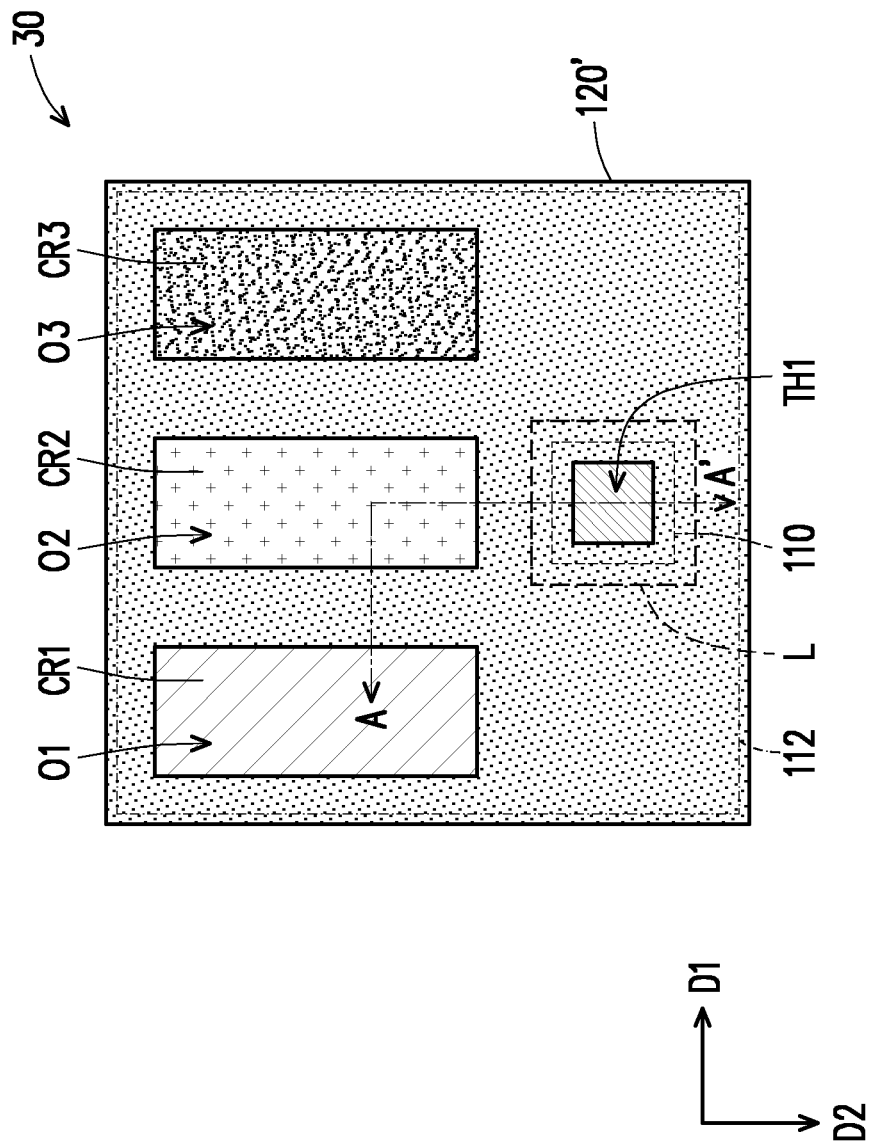
FIG. 3A is a schematic top view of a light shielding element substrate according to an embodiment of the present invention.
Figure 3B:
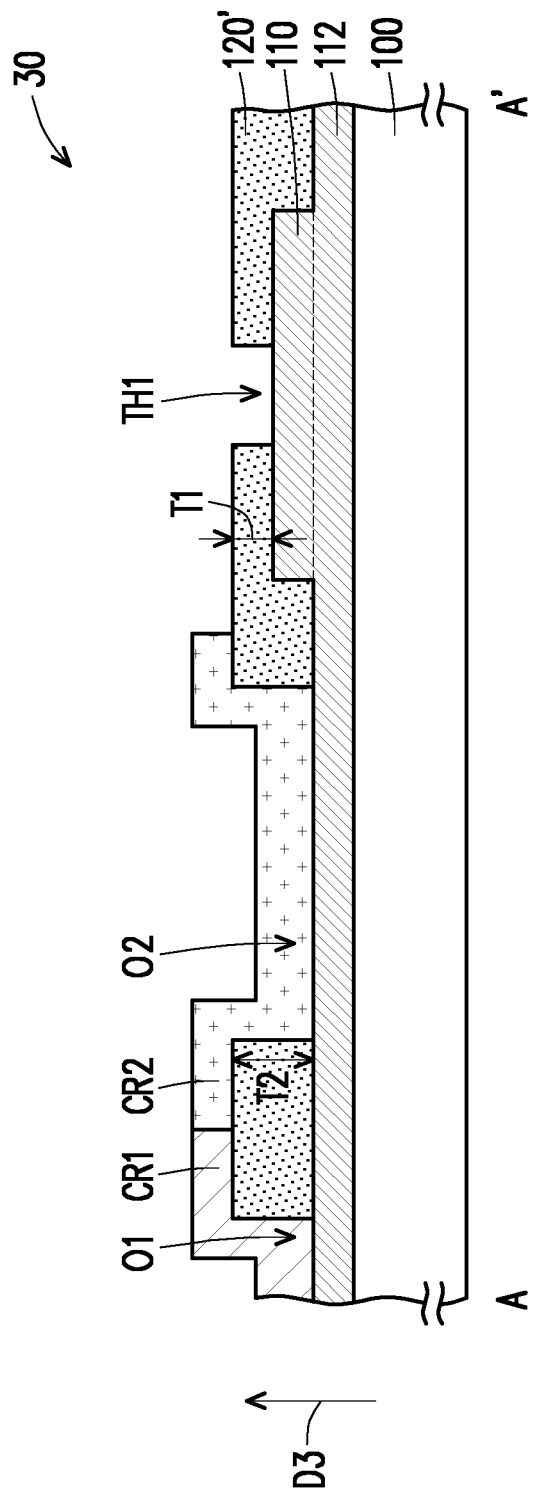
FIG. 3B is a schematic cross-sectional view taken along the line A-A' of FIG. 3A.

FIG. 3A is a schematic top view of a light shielding element substrate according to an embodiment of the present invention. FIG. 3B is a schematic cross-sectional view taken along the line A-A' of FIG. 3A.

It must be noted here that the embodiment of FIG. 3A and FIG. 3B follows the reference numerals and partial contents of the embodiment of FIG. 2A and FIG. 2B, wherein the same or similar components are denoted by the same or similar reference numerals, and the description of the same technical content is omitted. For the description of the omitted parts, reference may be made to the foregoing embodiments and will not be repeated in the following embodiments.

The main difference between the light shielding element substrate 30 of FIG. 3A and the light shielding element substrate 20 of FIG. 2A is that the light shielding element substrate 30 of FIG. 3A further includes an extending portion 112.

Referring to FIG. 3A and FIG. 3B, the extending portion 112 is extending from the bottoms of the first opening O1, the second opening O2, and the third opening O3 to the bottom of the first through hole TH1. The transparent island structure 110 is in contact with to the extending portion 112.

In this embodiment, the transparent island structure 110 and the extending portion 112 are integrally formed as a single-layer structure, but the present invention is not limited thereto. In other embodiments, the transparent island structure 110 and the extending portion 112 include different materials, and the transparent island structure 110 and the extending portion 112 are multi-layer structures. The extending portion 112 is configured to increase the adhesion between the transparent island structure 110 and the first substrate 100 (or other layers not shown on the first substrate 100).

Figure 4A:
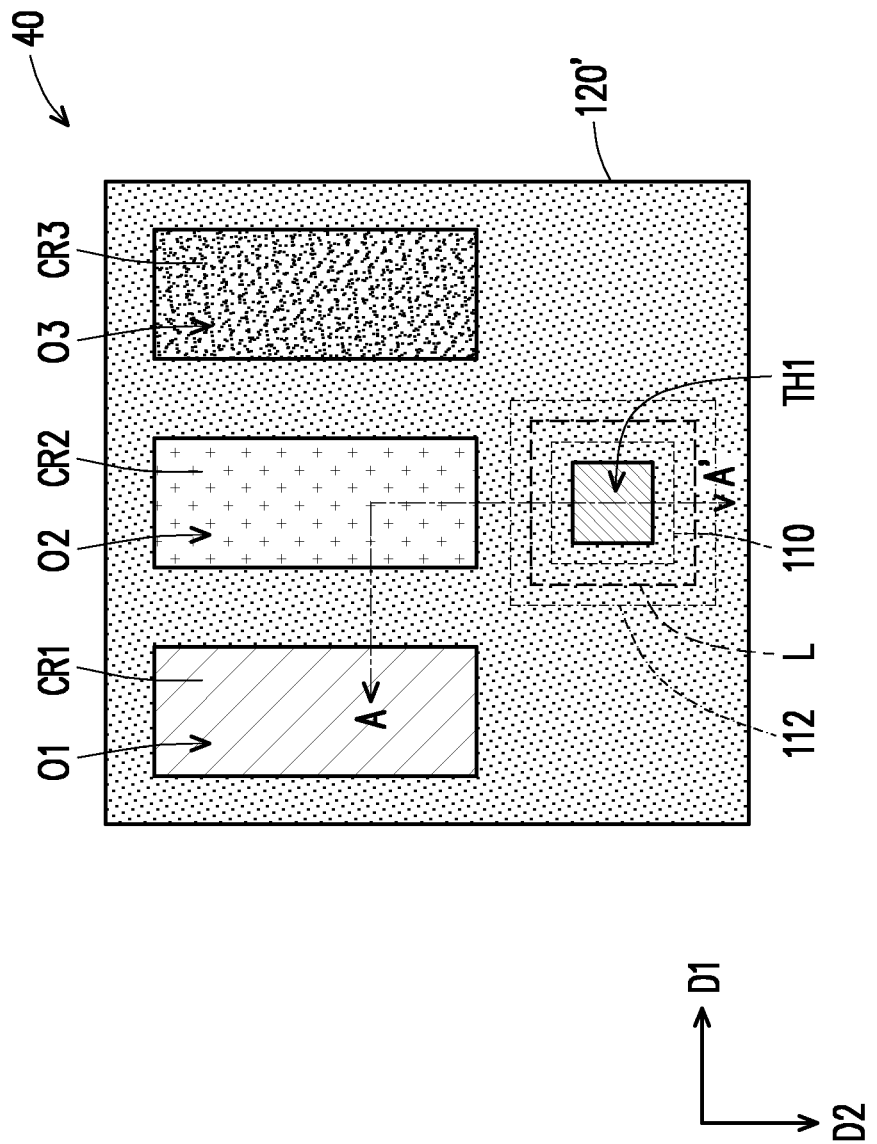
FIG. 4A is a schematic top view of a light shielding element substrate according to an embodiment of the present invention.
Figure 4B:
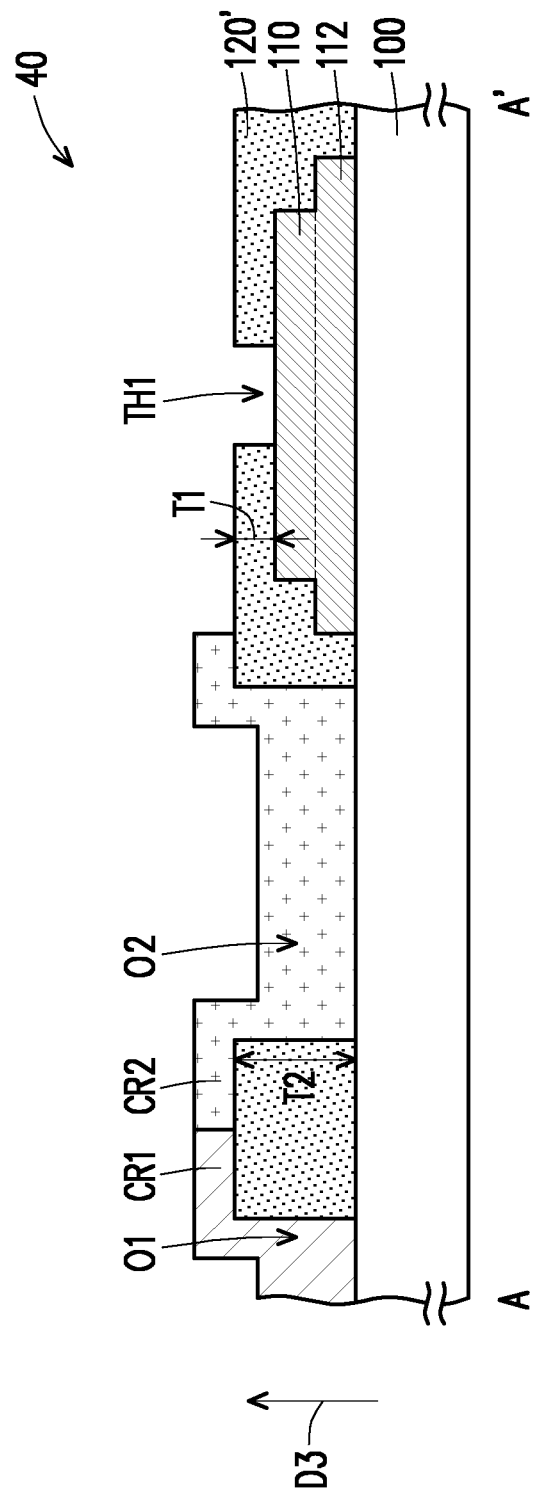
FIG. 4B is a schematic cross-sectional view taken along the line A-A' of FIG. 4A.

FIG. 4A is a schematic top view of a light shielding element substrate according to an embodiment of the present invention. FIG. 4B is a schematic cross-sectional view taken along the line A-A' of FIG. 4A.

It must be noted here that the embodiment of FIG. 4A and FIG. 4B follows the reference numerals and partial contents of the embodiment of FIG. 3A and FIG. 3B, wherein the same or similar components are denoted by the same or similar reference numerals, and the description of the same technical content is omitted. For the description of the omitted parts, reference may be made to the foregoing embodiments and will not be repeated in the following embodiments.

The main difference between the light shielding element substrate 40 of FIG. 4A and the light shielding element substrate 30 of FIG. 3A is that the transparent island structure 110 and the extending portion 112 of the light shielding element substrate 40 constitute a stepped structure.

Referring to FIG. 4A and FIG. 4B, the extending portion 112 is not overlapping with the first opening O1, the second opening O2, and the third opening O3. The extending portion 112 is in contact with the bottom of the transparent island structure 110, and the width of the extending portion 112 is greater than the width of the transparent island structure 110. The transparent island structure 110 and the extending portion 112 constitute a stepped structure. In this embodiment, the transparent island structure 110 and the extending portion 112 are integrally formed as a single-layer structure, but the present invention is not limited thereto. In other embodiments, the transparent island structure 110 and the extending portion 112 include different materials, and the transparent island structure 110 and the extending portion 112 are multi-layer structures. The extending portion 112 is configured to increase the adhesion between the transparent island structure 110 and the first substrate 100 (or other layers not shown on the first substrate 100).

Figure 5A:
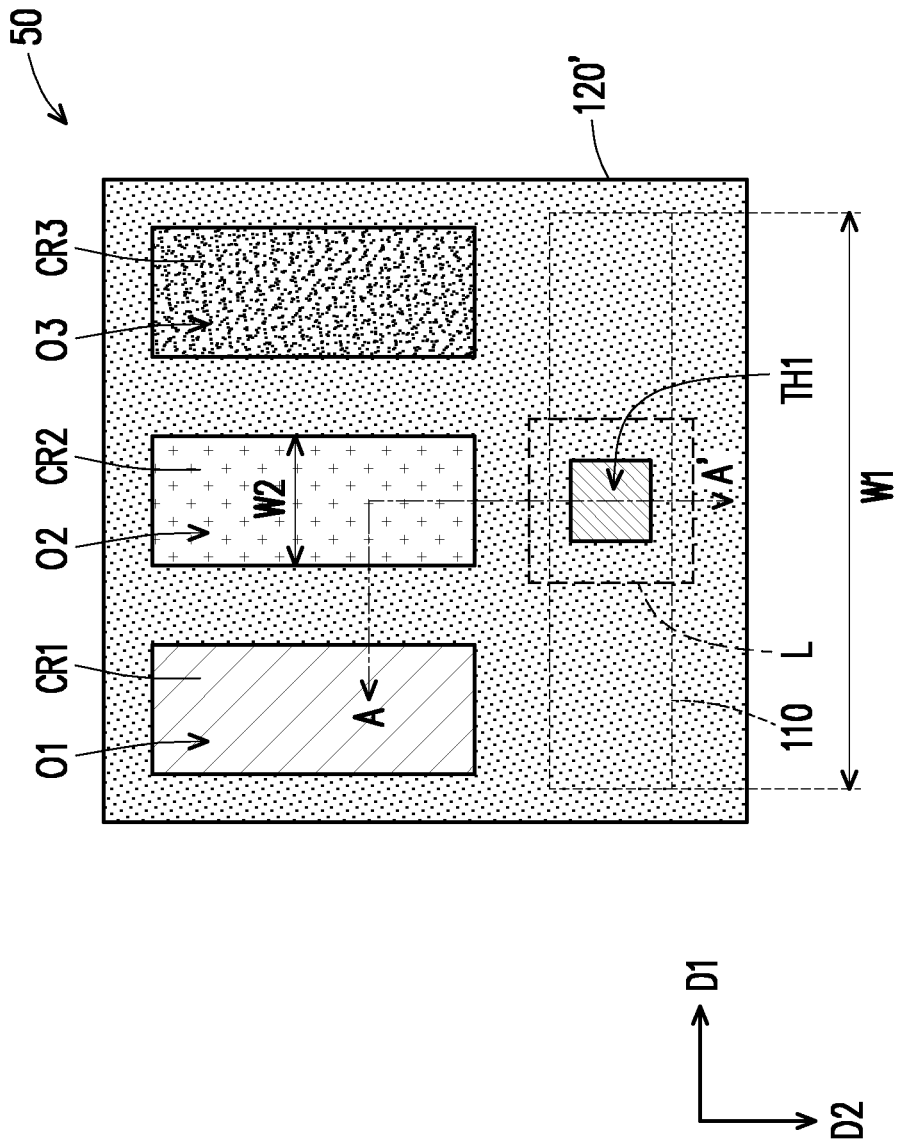
FIG. 5A is a schematic top view of a light shielding element substrate according to an embodiment of the present invention.
Figure 5B:
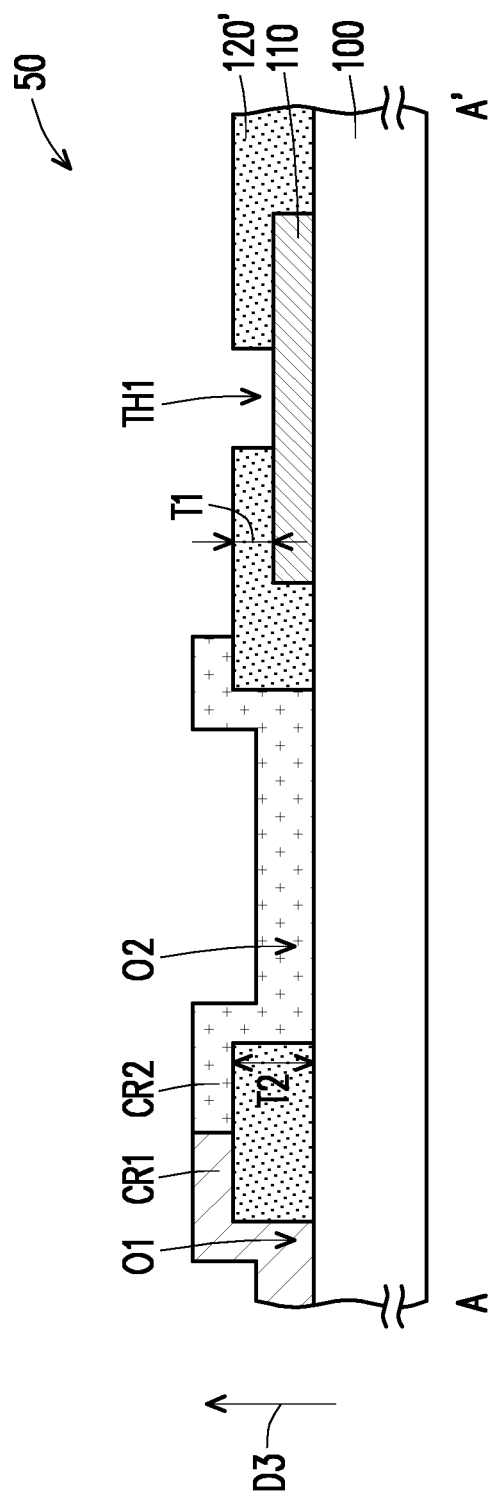
FIG. 5B is a schematic cross-sectional view taken along the line A-A' of FIG. 5A.

FIG. 5A is a schematic top view of a light shielding element substrate according to an embodiment of the present invention. FIG. 5B is a schematic cross-sectional view taken along the line A-A' of FIG. 5A.

It must be noted here that the embodiment of FIG. 5A and FIG. 5B follows the reference numerals and partial contents of the embodiment of FIG. 2A and FIG. 2B, wherein the same or similar components are denoted by the same or similar reference numerals, and the description of the same technical content is omitted. For the description of the omitted parts, reference may be made to the foregoing embodiments and will not be repeated in the following embodiments.

The main difference between the light shielding element substrate 50 of FIG. 5A and the light shielding element substrate 20 of FIG. 2A is that the width W1 of the transparent island structure 110 of the light shielding element substrate 50 of FIG. 5A in the first direction D1 is greater than the width W2 of the second opening O2 in the first direction Dl.

Referring to FIG. 5A and FIG. 5B, the transparent island structure 110 is located on the second direction D2 of the first opening O1, the second opening O2, and the third opening O3. In this embodiment, the larger the width W1 of the transparent island structure 110 is, the stronger the adhesion between the transparent island structure 110 and the first substrate 100 (or other layers not shown on the first substrate 100).

Figure 6A:
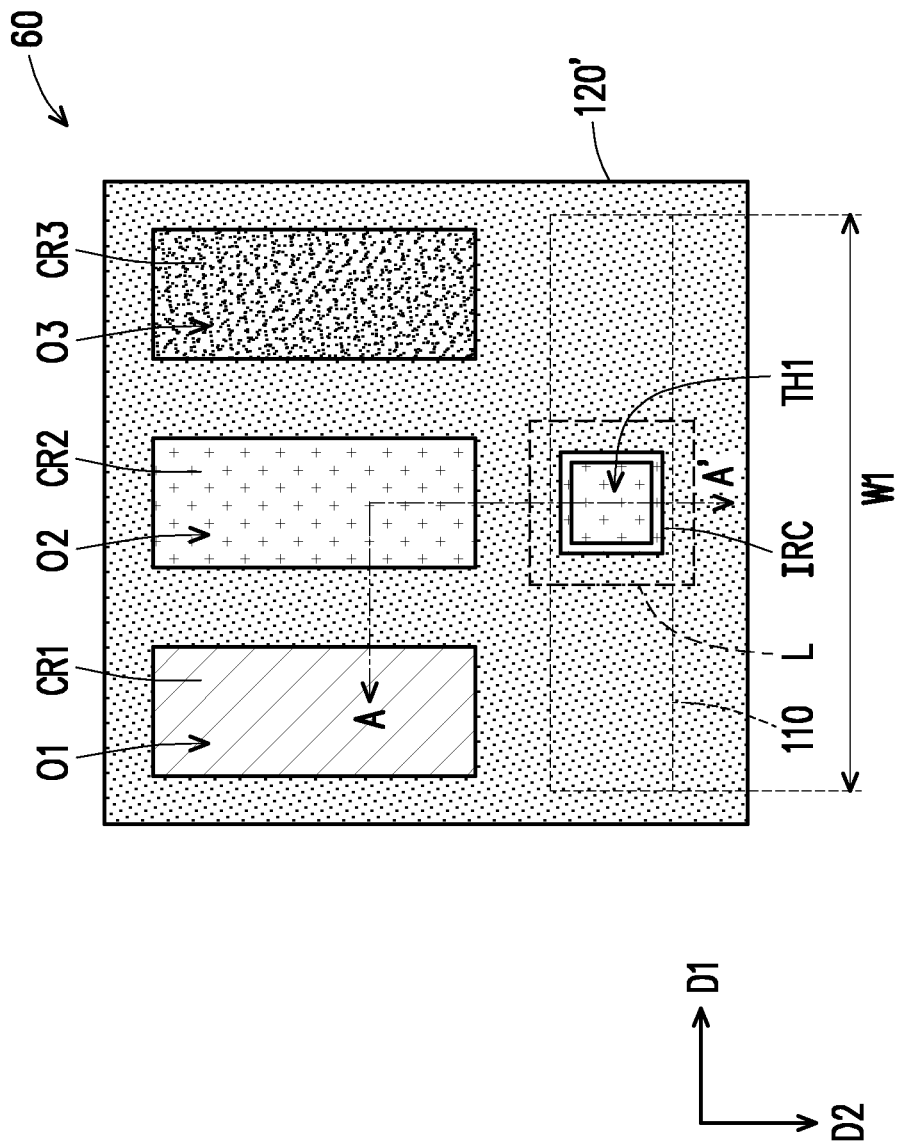
FIG. 6A is a schematic top view of a light shielding element substrate according to an embodiment of the present invention.
Figure 6B:
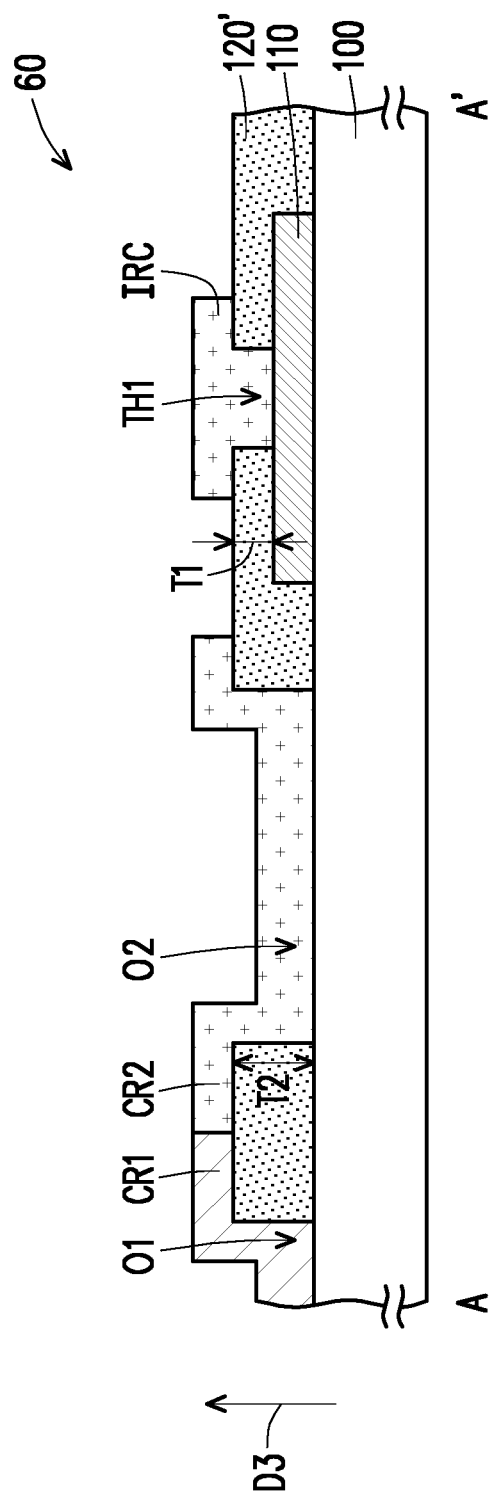
FIG. 6B is a schematic cross-sectional view taken along the line A-A' of FIG. 6A.

FIG. 6A is a schematic top view of a light shielding element substrate according to an embodiment of the present invention. FIG. 6B is a schematic cross-sectional view taken along the line A-A' of FIG. 6A.

It must be noted here that the embodiment of FIG. 6A and FIG. 6B follows the reference numerals and partial contents of the embodiment of FIG. 2A and FIG. 2B, wherein the same or similar components are denoted by the same or similar reference numerals, and the description of the same technical content is omitted. For the description of the omitted parts, reference may be made to the foregoing embodiments and will not be repeated in the following embodiments.

The main difference between the light shielding element substrate 60 of FIG. 6A and the light shielding element substrate 20 of FIG. 2A is that the light shielding element substrate 60 further includes an infrared light absorbing material IRC.

Referring to FIG. 6A and FIG. 6B, the infrared light absorbing material IRC is located in the first through hole TH1. In some embodiments, the infrared light absorbing material IRC has a transmittance of less than or equal to 3% for light with a wavelength greater than or equal to 600 nm, thereby reducing the negative effects of infrared light on the photosensitive element L.

The infrared light absorbing material IRC has a single-layer or multi-layer structure.

In some embodiments, the material of the infrared light absorbing material IRC is selected from one or more of the material of the first color conversion element CR1, the material of the second color conversion element CR2, and the material of the third color conversion element CR3. In this embodiment, the material of the infrared light absorbing material IRC is the same as the material of the second color conversion element CR2, such as a green color filter material, but the invention is not limited thereto.

Figure 7:
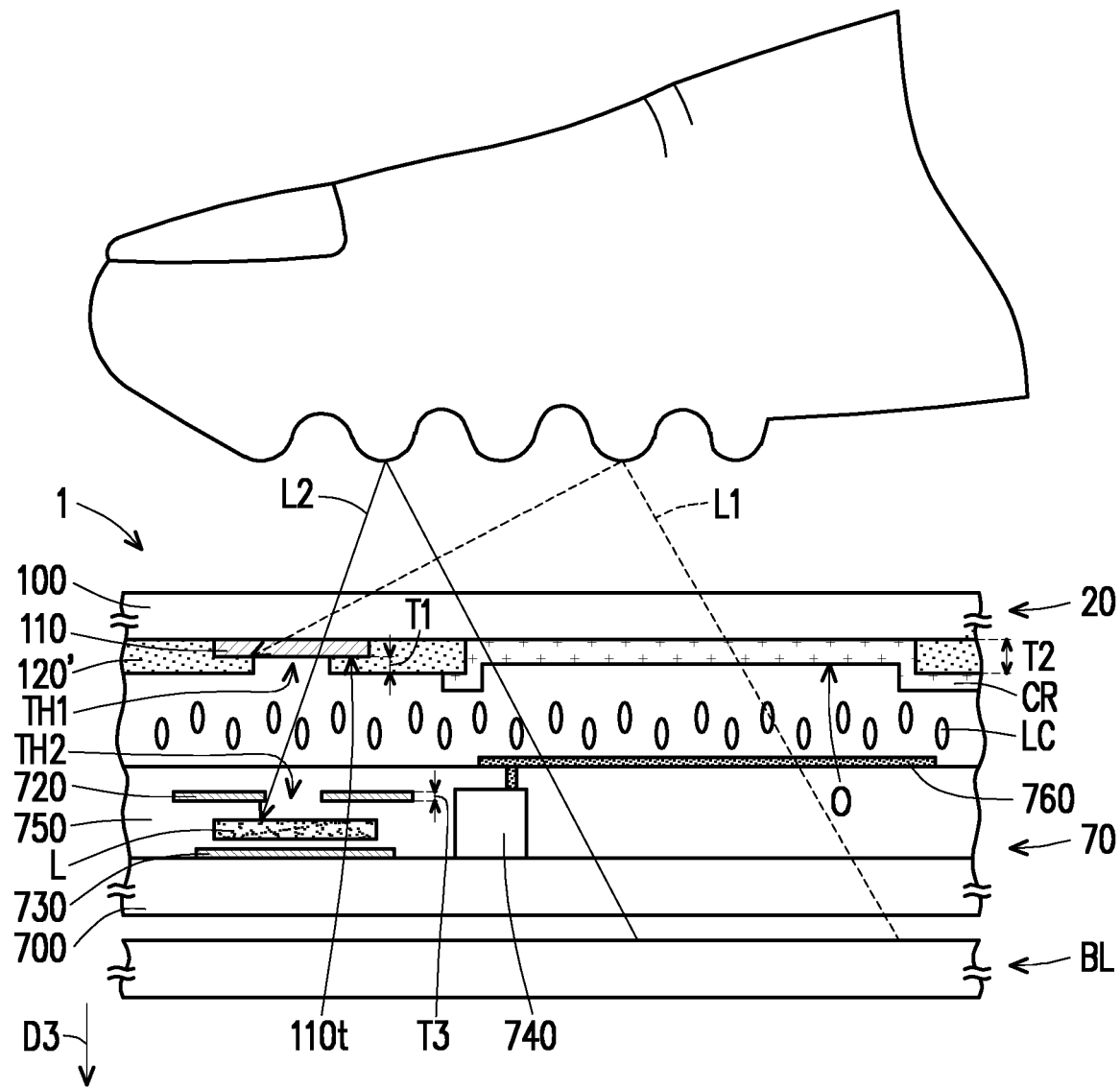
FIG. 7 is a schematic cross-sectional view of a display device according to an embodiment of the invention.

FIG. 7 is a schematic cross-sectional view of a display device according to an embodiment of the invention.

It must be noted here that the embodiment of FIG. 7 follows the reference numerals and partial contents of the embodiment of FIG. 2A and FIG. 2B, wherein the same or similar components are denoted by the same or similar reference numerals, and the description of the same technical content is omitted. For the description of the omitted parts, reference may be made to the foregoing embodiments and will not be repeated in the following embodiments.

Referring to FIG. 7, the display device 1 includes a light shielding element substrate 20 and an active element substrate 70.

The light shielding element substrate 20 includes a first substrate 100, a transparent island structure 110, a first light shielding layer 120', and a color conversion element CR. The transparent island structure 110 is located on the first substrate 100. The first light shielding layer 120' is located on the transparent island structure 110. The first light shielding layer 120' is overlapping with a part of the top surface 110t of the transparent island structure 110 in the normal direction D3 of the first substrate 100, and the first light shielding layer 120' has a first through hole TH1 overlapping with the top surface 110t of the transparent island structure 110. The color conversion element CR is located in the opening O of the first light shielding layer 120', and the opening O is not overlapping with the transparent island structure 110 in the normal direction D3 of the first substrate 100.

The active element substrate 70 is overlapping with the light shielding element substrate 20, and includes a second substrate 700, a photosensitive element L, and a second light shielding layer 720. In this embodiment, the active element substrate 70 further includes a reflection layer 730, a pixel control circuit 740, an insulating layer 750, and a pixel electrode 760.

The photosensitive element L, the second light shielding layer 720, the reflection layer 730, the pixel control circuit 740, the insulating layer 750, and the pixel electrode 760 are located on the second substrate 700.

The reflection layer 730 is located between the photosensitive element L and the second substrate 700. The reflection layer 730 is, for example, a conductive material (such as a metal). In some embodiments, the reflection layer 730 can be used as a wire for transmitting signals, but the present invention is not limited thereto.

The photosensitive element L may be any type of photosensitive element. In some embodiments, for example, the photosensitive element L includes at least one of the following materials: silicon-rich oxide, silicon-rich nitride, silicon-rich oxynitride, silicon-rich carbide, silicon-rich oxycarbide, hydrogenated silicon-rich oxide, hydrogenated silicon-rich nitride and hydrogenated silicon-rich carbide. In other embodiments, the photosensitive element L includes a stacked layer of a P-type semiconductor and an N-type semiconductor.

The second light shielding layer 720 is located between the photosensitive element L and the first light shielding layer 120'. The second light shielding layer 720 has a second through hole TH2. The photosensitive element L is overlapping with the second through hole TH2 and the first through hole TH1 in the normal direction D3 of the first substrate 100. In some embodiments, the thickness T3 of the second light shielding layer 720 is smaller than the thickness T2 of the first light shielding layer 120', but the invention is not limited thereto.

In some embodiments, the material of the second light shielding layer 720 includes metal. In some embodiments, the second light shielding layer 720 can be used as a wire for transmitting signals, but the present invention is not limited thereto.

The pixel control circuit 740 includes one or more active elements, and the pixel control circuit 740 is configured to control the voltage on the pixel electrode 760. The pixel electrode 760 is electrically connected to the pixel control circuit 740. In some embodiments, the reflection layer 730 and/or the second light shielding layer 720 can be formed together with the conductive structure in the pixel control circuit 740, but the present invention is not limited thereto.

The insulating layer 750 covers the reflection layer 730, the second light shielding layer 720, the photosensitive element L, and the pixel control circuit 740. In FIG. 7, the insulating layer 750 is simplified and shown as one piece. However, in practice, the insulating layer 750 has a multi-layer structure, and the reflection layer 730, the second light shielding layer 720, the photosensitive element L, and the pixel control circuit 740 are distributed in the foregoing multi-layer structure.

The liquid crystal layer LC is located between the light shielding element substrate 20 and the active element substrate 70. The active element substrate 70 is located between the light shielding element substrate 20 and the backlight module BL.

In this embodiment, the display device 1 is configured to identify fingerprint, the light L1, L2 emitted by the backlight module BL is reflected by the fingerprint and then returns to the display device 1, wherein the light L1 with a large incident angle is blocked by the first light shielding layer 120', and the light L2 with a small incident angle passes through the first through hole TH1 and the second through hole TH2, and is then detected by the photosensitive element L. Based on the above, the contrast of the image detected by the photosensitive element L can be improved.

In this embodiment, the light shielding element substrate 20 of the display device 1 can be replaced with the light shielding element substrate of any of the foregoing embodiments.

Figure 8:
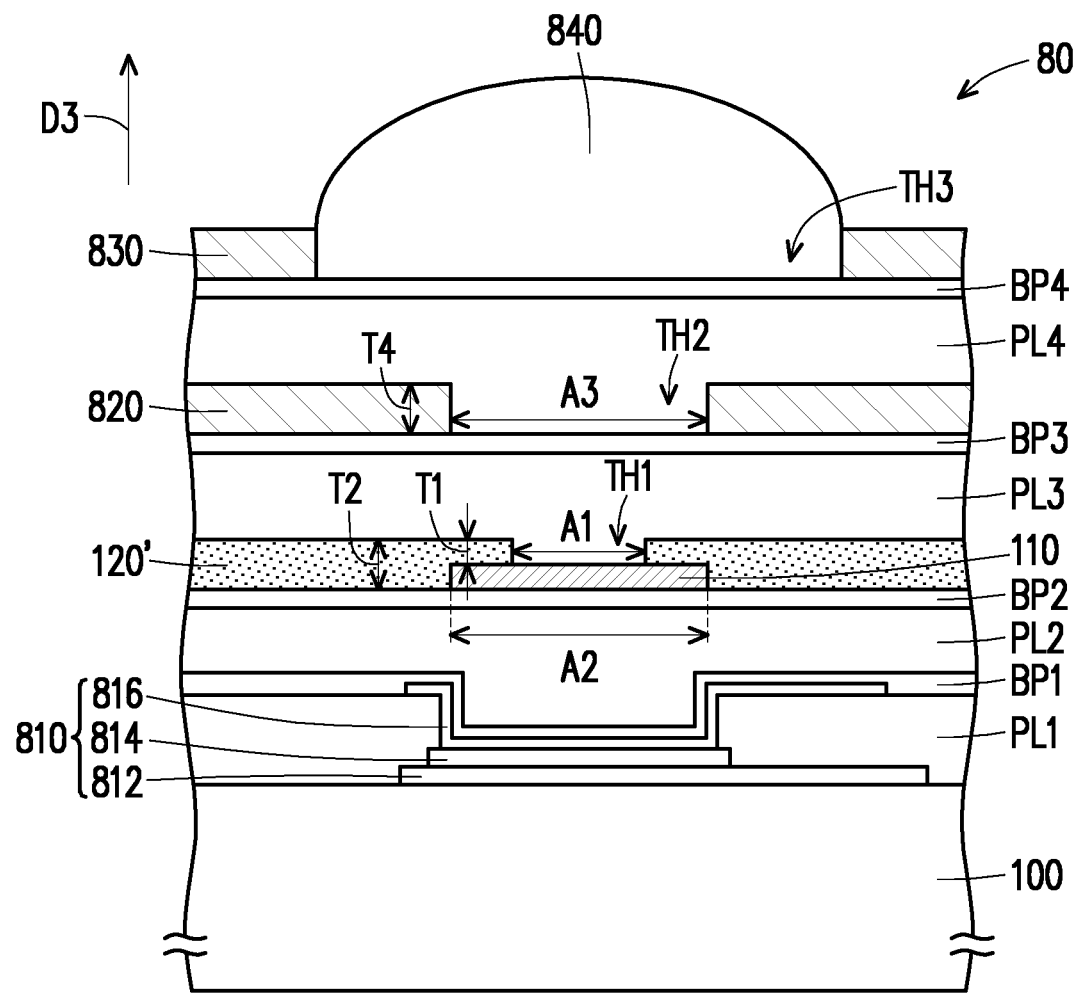
FIG. 8 is a schematic cross-sectional view of a light shielding element substrate according to an embodiment of the present invention.

FIG. 8 is a schematic cross-sectional view of a light shielding element substrate according to an embodiment of the present invention.

It must be noted here that the embodiment of FIG. 8 follows the reference numerals and partial contents of the embodiment of FIG. 2A and FIG. 2B, wherein the same or similar components are denoted by the same or similar reference numerals, and the description of the same technical content is omitted. For the description of the omitted parts, reference may be made to the foregoing embodiments and will not be repeated in the following embodiments.

Referring to FIG. 8, the photosensitive element 810 of the light shielding element substrate 80 is formed on the first substrate 100. The photosensitive element 810 includes a first electrode 812, a photosensitive layer 814, and a second electrode 816. The photosensitive layer 814 is located between the first electrode 812 and the second electrode 816. In some embodiments, the first electrode 812 is formed on the first substrate 100 and includes metal or other conductive materials. The photosensitive layer 814 is formed on the first electrode 812 and includes silicon-rich oxide or other photosensitive materials. The first planarization layer PL1 is located on the photosensitive layer 814, the first electrode 812, and the first substrate 100, and has an opening overlapping with the photosensitive layer 814. The second electrode 816 is formed in the opening of the first planarization layer PL1 and in contact with the photosensitive layer 814. The second electrode 816 includes a transparent conductive material.

The first buffer layer BP1 is located on the second electrode 816 and the first planarization layer PL1. The second planarization layer PL2 is located on the first buffer layer BP1, and the second buffer layer BP2 is located on the second planarization layer PL2.

The transparent island structure 110 and the first light shielding layer 120' are formed on the second buffer layer BP2. In some embodiments, the second buffer layer BP2 can also be called an extending portion (such as the extending portion 112 of the embodiment shown in FIG. 3B), and the second buffer layer BP2 can increase the adhesion between the transparent island structure 110 and the second planarization layer PL2. The first light shielding layer 120' has a first through hole TH1, and the photosensitive element 810 is overlapping with the first through hole TH1 in the normal direction D3 of the first substrate 100. The photosensitive element 810 is located between the first substrate 100 and the transparent island structure 110.

The third planarization layer PL3 is located on the first light shielding layer 120'. The third buffer layer BP3 is located on the third planarization layer PL3. The second light shielding layer 820 is located on the third buffer layer BP3 on the third planarization layer PL3, and has a second through hole TH2 overlapping with the first through hole TH1 in the normal direction D3 of the first substrate 100. The photosensitive element 810 is overlapping with the second through hole TH2 and the first through hole TH1 in the normal direction D3 of the first substrate 100. In this embodiment, the thickness T4 of the second light shielding layer 820 is greater than the thickness T1 of the first light shielding layer 120', and the width A3 of the second through hole TH2 is greater than the width Al of the first through hole TH1. In this embodiment, the second light shielding layer 820 and the first light shielding layer 120' include the same or different materials.

The fourth planarization layer PL4 is located on the second light shielding layer 820. The fourth buffer layer BP4 is located on the fourth planarization layer PL4. The third light shielding layer 830 and prism (Lens) 840 are located on the fourth buffer layer BP4. The prism (Lens) 840 is located in the third through hole TH3 of the third light shielding layer 830, wherein the third through hole TH3 is overlapping with the second through hole TH2 and the first through hole TH1 in the normal direction D3 of the first substrate 100.

In this embodiment, the light shielding element substrate 80 is attached to a back surface of other display panels (not shown), for example. For example, the light shielding element substrate 80 is attached to a back surface of an OLED display panel, a micro-LED display panel, or other types of display panels. The light emitted by the aforementioned display panel is transmitted to the photosensitive element 810 in the light shielding element substrate 80 after being reflected.

Base on the aforementioned, the arrangement of the transparent island structure can reduce the width of the first through hole of the first light shielding layer, thereby the effect of light collimation of the first light shielding layer can be improved. Therefore, the contrast of the image detected by the photosensitive element can be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A light shielding element substrate, comprising:
a substrate;
a transparent island structure, located on the substrate; and
a first light shielding layer, located on the transparent island structure, wherein the first light shielding layer is overlapping with a part of a top surface of the transparent island structure, and the first light shielding layer has a first through hole overlapping with the top surface of the transparent island structure, wherein a thickness of the first light shielding layer at the first through hole is T1, and a thickness of the first light shielding layer beside the transparent island structure is T2, and T1 is smaller than T2, wherein a material of the first light shielding layer includes a cured photoresist, and an optical density of the first light shielding layer is greater than 5.

2. The light shielding element substrate of claim 1, wherein a width of the first through hole is smaller than a width of the transparent island structure.

3. A light shielding element substrate, comprising:
a substrate;
a transparent island structure, located on the substrate; and
a first light shielding layer, located on the transparent island structure, wherein the first light shielding layer is overlapping with a part of a top surface of the transparent island structure, and the first light shielding layer has a first through hole overlapping with the top surface of the transparent island structure, wherein a thickness of the first light shielding layer at the first through hole is T1, and a thickness of the first light shielding layer beside the transparent island structure is T2, and T1 is smaller than T2; and
a first color conversion element, located in a first opening of the first light shielding layer, and the first opening is not overlapping with the transparent island structure.

4. The light shielding element substrate of claim 3, wherein a thickness of the first light shielding layer at the first opening is T2, and the thickness T2 is 1000 nm to 2000 nm.

5. The light shielding element substrate of claim 3, wherein the thickness T1 is 200 nm to 1200 nm.

6. The light shielding element substrate of claim 3, further comprises:
an extending portion, extending from a bottom of the first opening to a bottom of the first through hole, wherein the transparent island structure is in contact with the extending portion.

7. The light shielding element substrate of claim 3, further comprises:
an extending portion, in contact with a bottom of the transparent island structure, and a width of the extending portion is greater than a width of the transparent island structure, wherein the transparent island structure and the extension constitute a stepped structure.

8. The light shielding element substrate of claim 3, further comprises:
a second color conversion element and a third color conversion element, respectively located in a second opening and a third opening of the first light shielding layer, and the second opening and the third opening are not overlapping with the transparent island structure, wherein the first opening, the second opening, and the third opening are arranged along a first direction, and a width of the transparent island structure in the first direction is greater than a width of the second opening in the first direction.

9. The light shielding element substrate of claim 1, wherein a thickness of the transparent island structure is 200 nm to 1200 nm.

10. The light shielding element substrate of claim 1, further comprises:
an infrared light absorbing material, located in the first through hole.

11. The light shielding element substrate of claim 1, further comprises:
a photosensitive element, located on the substrate and overlapping with the first through hole in a normal direction of the substrate.

12. The light shielding element substrate of claim 11, further comprises:
a planarization layer, located on the first light shielding layer;
a second light shielding layer, located on the planarization layer and having a second through hole overlapping with the first through hole in the normal direction of the substrate, wherein the photosensitive element is overlapping with the second through hole and the first through hole, and the photosensitive element is located between the substrate and the transparent island structure.

13. A display device, comprising:
a light shielding element substrate, comprising:
a first substrate;
a transparent island structure, located on the first substrate; and
a first light shielding layer, located on the transparent island structure, wherein the first light shielding layer is overlapping with a part of a top surface of the transparent island structure, and the first light shielding layer has a first through hole overlapping with the top surface of the transparent island structure, wherein a thickness of the first light shielding layer at the first through hole is T1, and a thickness of the first light shielding layer beside the transparent island structure is T2, and T1 is smaller than T2; and
an active element substrate, overlapping with the light shielding element substrate and comprising:
a second substrate;
a photosensitive element, located on the second substrate; and
a second light shielding layer, located between the photosensitive element and the first light shielding layer, and the second light shielding layer has a second through hole, wherein the photosensitive element is overlapping with the second through hole and the first through hole in a normal direction of the first substrate.

14. The display device of claim 13, wherein a material of the second light shielding layer comprises metal.

15. The display device of claim 13, wherein the light shielding element substrate further comprises:
a color conversion element, located in an opening of the first light shielding layer, and the opening is not overlapping with the transparent island structure.

16. The display device of claim 15, further comprises:
a liquid crystal layer, located between the light shielding element substrate and the active element substrate; and
a backlight module, wherein the active element substrate is located between the light shielding element substrate and the backlight module.

17. The light shielding element substrate of claim 3, wherein a width of the first through hole is smaller than a width of the transparent island structure.

18. The light shielding element substrate of claim 3, wherein a thickness of the transparent island structure is 200 nm to 1200 nm.

19. The light shielding element substrate of claim 3, further comprises:
a photosensitive element, located on the substrate and overlapping with the first through hole in a normal direction of the substrate.

20. The light shielding element substrate of claim 1, wherein the thickness T1 is 200 nm to 1200 nm, and the thickness T2 is 1000 nm to 2000 nm.

* * * * *